(12) United States Patent
Newman et al.

(10) Patent No.: US 8,306,894 B2
(45) Date of Patent: Nov. 6, 2012

(54) ECONOMIC INTELLIGENCE

(75) Inventors: Kurt Newman, Matthews, NC (US);
Debashis Ghosh, Charlotte, NC (US);
David Joa, Irvine, CA (US); Tim Bendel, Charlotte, NC (US); Mark Krein, Charlotte, NC (US); Aaron Lai, Alameda, CA (US)

(73) Assignee: Bank of America Corporation, Charlotte, NC (US)

( * ) Notice: Subject to any disclaimer, the term of this patent is extended or adjusted under 35 U.S.C. 154(b) by 584 days.

(21) Appl. No.: 12/430,510

(22) Filed: Apr. 27, 2009

(65) Prior Publication Data

US 2010/0274699 A1 Oct. 28, 2010

(51) Int. Cl.
*G06Q 40/00* (2012.01)
(52) U.S. Cl. .................................... 705/36 R; 705/35
(58) Field of Classification Search ...................... 705/35
See application file for complete search history.

(56) References Cited

U.S. PATENT DOCUMENTS

2008/0262877 A1* 10/2008 Hargroder ........................ 705/4
2008/0270209 A1* 10/2008 Mauseth et al. ................. 705/7

OTHER PUBLICATIONS

Search report from EP application No. 10250834.8-2221 dated Jul. 23, 2010.
New Zealand Patent Application No. 596192 Office Action dated Nov. 9, 2011.

* cited by examiner

*Primary Examiner* — Hani M Kazimi
*Assistant Examiner* — Hatem M Ali
(74) *Attorney, Agent, or Firm* — Banner & Witcoff, Ltd.; Michael A. Springs

(57) ABSTRACT

Aspects of the invention provide for the use of transactional data in the calculation of sub-scores that may be used in an index score. The sub-scores may include an account sub-score, an investment sub-score, and/or a discretionary sub-score. One or more sub-scores that represent an individual, an entity, or an economic sector may be used to create an index. Further aspects relate to calculating novel indices that more accurately represent and/or predict economic conditions.

20 Claims, 4 Drawing Sheets

ECONOMIC INTELLIGENCE

FIELD OF THE INVENTION

Aspects of the disclosure relate to using financial transactional data to assist in the formation of an index score. More specifically, aspects of the disclosure relate to using individual and collective index scores to create an index of economic conditions.

BACKGROUND

Currently, there are known indexes that attempt to monitor the economic conditions of a region, such as the United States. Indices exist that are based on surveys where consumers state if they believe the economy will improve or deteriorate during the next few months. While providing a subjective measure of the economic forces, they are subjected to emotions, such as panic and/or exited exuberance.

Currently, there is no way to determine that every individual providing the subjective input has the same information, or if they have accurate information. Moreover, several indications demonstrate that not all individuals conduct actions consistent to what they reveal in surveys. There have been instances where the above-referenced indexes are not correlated with the economic conditions. For example, stock prices may advance while the indexes show very weak consumer sentiment.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, an index may be created with actual transactional data. The index is configured to provide a realistic measure of the economic climate when compared to existing more-subjective indexes. In one embodiment, the index may be utilized to forecast economic conditions for multiple time frames, industries or economic sectors, geographic regions, and/or other criteria. In one embodiment, the index is formed from several individual index scores that each represent an individual or an entity.

Further aspects relate to the use of transactional data to create one or more sub-scores for use in an economic index score. The sub-scores are based upon actual transactional data. In one embodiment, transaction dynamics across different types of retail purchases are used to reveal trends in how the market place is changing. In one embodiment, an investment sub-score may be calculated. The calculation of the sub-score may consider the source(s) of funding for the investment, the duration of the investment, and the amount of the funding for the investment as a ratio to a user's or entity's overall spending for a time-frame.

Another aspect relates to calculating an account sub-score that may be used in an index to measure economic conditions. In one embodiment, several financial accounts associated with an individual or entity are categorized into an account type. The amount of funds within the financial accounts may also be determined. In one embodiment, the account sub-score may be a function of the quantity of funds within the different account types for a time frame. Further consideration may include determining that at least one account was opened or closed within a time frame and/or determining a geographic location where the at least one account was opened or closed.

Another aspect of the invention relates to calculating a discretionary spending sub-score. In one embodiment, transactions within the transactional data may be categorized as either discretionary or necessity. In one embodiment, the quantity of transactions and the amount of spending for the transactions for a time frame are determined. In another embodiment, it may be determined whether at least one transaction was conducted with at least one specific vendor.

Another aspect relates to creating an index score utilizing one or more sub-scores. In one embodiment, demographic data may be used in conjunction with one or more sub-scores when creating the index.

BRIEF DESCRIPTION OF THE DRAWINGS

The present disclosure is illustrated by way of example and not limited in the accompanying figures in which like reference numerals indicate similar elements, where.

DETAILED DESCRIPTION

In accordance with various aspects of the disclosure, systems and methods are illustrated for generating transactional financial statements and indices. A financial institution such as a bank may utilize customer transactional data to assist in credit decisions and/or product offerings.

Figure 1:
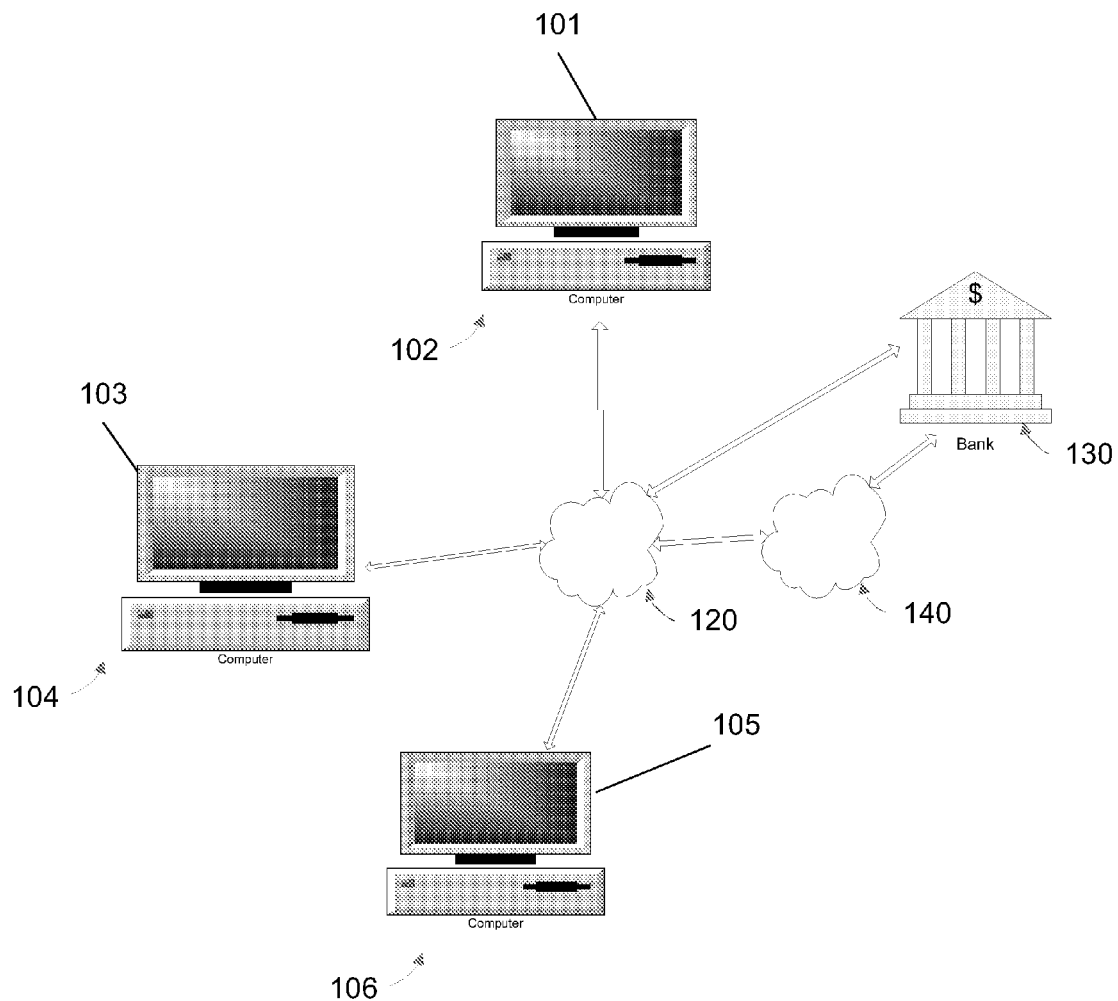
FIG. 1 illustrates an example of a suitable operating environment in which various aspects of the invention may be implemented.

FIG. 1 illustrates an example of a suitable operating environment in which various aspects of the disclosure may be implemented. Computers 102, 104, 106 may be located at various locations such as locations 101, 103, and 105. The location may be internal or external to a financial institution such as a bank 130. Computers 102, 104, 106 may be transactional computers or terminals found on various internal and external networks. The computers 102, 104, 106 may contain transactional information for numerous customers. Such transactional data may include credit and debit card transactions, electronic bill payment transactions, and demand deposit account transactions. Those skilled in the art will realize that additional computers may be included and that those described below in the illustrative embodiments are not intended to be limiting of the scope of the invention. Furthermore, the transactional data may also include numerous other types of customer transactional data which may be used in various embodiments of the invention FIG. 1 further illustrates computers 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Computers 102, 104, and 106 may communicate with one another or with a financial institution such as bank 130 via communication network 120 in ways that are well known in the art. The existence of any of various well-known protocols, such as TCP/IP, Ethernet, FTP, HTTP, Bluetooth®, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 before being connected to bank 130.

Figure 2:
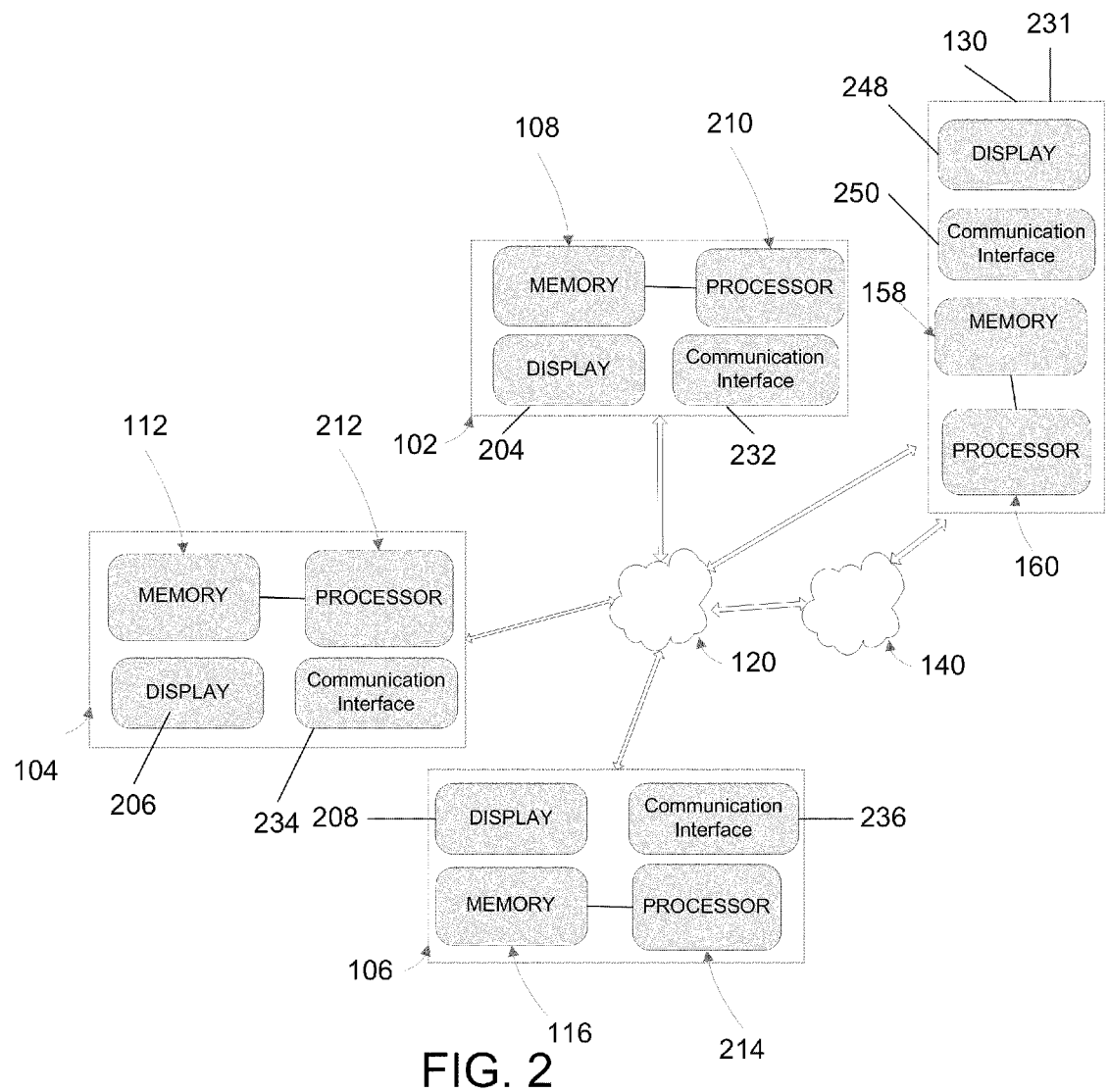
FIG. 2 illustrates a simplified diagram of a transactional computer in accordance with an aspect of the invention.

FIG. 2 illustrates a simplified diagram of a computer in accordance with an aspect of the invention. The computers may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, computer 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the computers 102, 104, and 106 and server 231 may include non-volatile and/or volatile memory.

FIG. 3 shows a flow chart of an exemplary method of calculating one or more sub-scores that may be utilized in the formation of an index in accordance with embodiments of the invention. At step 302, transactional data relating to an individual, an entity, or economic sector may be retrieved. The transactional data may reside on one more computer-readable mediums, such as memories 108, 112, and 116, which may be located within numerous internal and/or external systems. Indeed, at least a portion of the transactional data retrieved as part of step 302 is remotely located from other transactional data. Exemplary transactional data may include checking account transactions, electronic bill payments transactions, and/or credit/debit card transactions. While the retrieval of the transactional data is shown by way of step 302, those skilled in the art having the benefit of this disclosure will readily appreciate that the retrieval of the transactional data may be conducted before, during, or after any other steps or processes within the methods disclosed herein. In one embodiment, the retrieval of data is ongoing and is being updated on a routine basis.

Figure 3A:
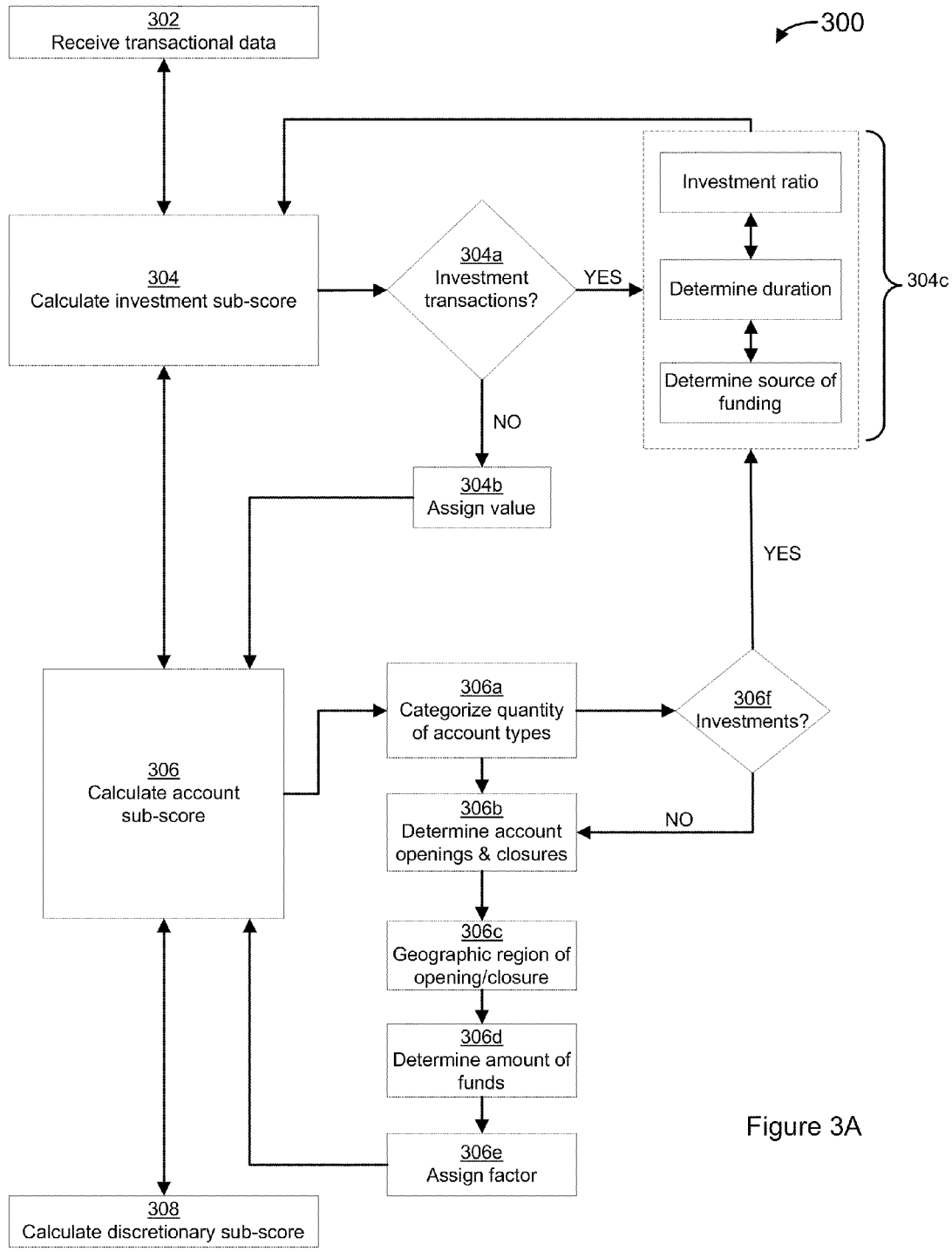
FIGS. 3A and 3B are flowcharts of exemplary methods in accordance with certain embodiments of the invention.

In one embodiment, an investment sub-score may be calculated at step 304. The investment sub-score may be calculated with consideration to one or more investment-related elements, variables, and weightings. As the exemplary method provided in FIG. 3a shows, one embodiment may determine whether the transactional data collected in step 302 comprises an investment transaction (see 304a). In one embodiment, if the transactional data does not comprise an investment, a predefined value may be assigned as the investment sub-score (see 304b). In one embodiment where the predefined value is assigned, the value may be indicative of an unfavorable economic climate. Yet in another embodiment, the value may indicate that economic climate (at least with respect to that sub-score) is neither favorable nor unfavorable. Indeed, as explained in more detail below, if the transactional data comprises an investment (or even several investments), this would not automatically indicate a favorable score for the investment sub-score. Rather, as explained in more detail below, many considerations which have not been historically considered when predicting the economic climate, may be considered when determining the status of the economic climate.

If at step 304a, it is determined that the transactional data (i.e., the data retrieved at step 302), comprises investment transaction(s), step 304c may be performed. At step 304c, one or more aspects regarding the investment transaction may be considered. In one embodiment, the source of funding for the investment is determined. Indeed, the source of funding for an investment transaction may provide valuable information when calculating the investment sub-score. For example, if an individual or an entity transfers funds from a low-interest checking account to purchase stocks or ETFs (electronically traded funds), this may indicate a more favorable economic climate than, for example, if the individual or entity removed money from a stock brokerage to invest in a more-stable, low yield CD (Certificate of Deposit).

In yet another embodiment, the duration of the investment(s) is determined. Indeed, the amount of time an individual or entity is willing to commit funds for may provide an indication of the impact of any favorable or unfavorable economic conditions. For example, if an entity that routinely reinvests funds from 2-year term CDs, suddenly reinvests the funds in a 6-month term CD, this may be indicative of favorable economic conditions. Moreover, even if an individual or entity sells stocks and reinvests the funds into a CD may not a very unfavorable market. Indeed, if the individual or entity invests in a 6-month CD rather than a 2-year CD, this may factor into how long or severe any unfavorable economic conditions (either real or perceived) may be felt. Indeed, merely classifying all CDs or any other type of investment into a single category may not provide an accurate indication of economic conditions for a specific individual, entity, or economic sector.

Furthermore, one or more of the considerations of 304c may be within the context of a time-frame. For example, in one embodiment, the amount of funds committed to the investment is determined as a ratio to a user's or entity's spending (or spending within the economic sector for the entities or individuals within that sector), such as overall spending or discretionary spending for a time-frame. Indeed, while a steady monthly commitment of funding for investments may not provide an accurate picture, determining the commitment in view of total or discretionary spending may provide a more accurate insight to the economic conditions facing that individual or entity.

In one embodiment, discretionary spending may be determined by industry in which the funds were committed to. In one embodiment, industries that may be categorized as discretionary spending may include, but are not limited to: Airlines, Coffee Stores, Craft Stores, Entertainment, Lodging, Rental Cars, Restaurants, Retailers—Up Scale, Smoothie Stores, and/or Travel Services. Further calculations of discretionary spending are provided in more detail below in context of step 308, which may be incorporated into step 304c.

As shown in FIG. 3, steps 304a-304c may be performed as a continuous repeated path. Those skilled in the art, however, will readily appreciate that specific steps may be omitted, modified, or introduced without departing from the scope of this disclosure. Indeed, in one embodiment, as discussed above, information from step 308 may be received and/or utilized at step 304.

In one embodiment, method 300 may incorporate the calculation of an account sub-score (i.e., step 306). While step 306 is shown below step 304, there is no requirement that step 304 be conducted first. Indeed, steps 304 and 306 may occur in any order and/or simultaneously. In one embodiment, step 306a may categorize a quantity of financial accounts associated with the individual or entity into an account type. Exemplary account types may include, but are not limited to: checking, savings, investment, mortgage, HELOC (Home Equity Line or Credit), and other loans. Indeed, such categories may further be subdivided to allow the analysis of more specific categories. For example, an entity may have a primary and a secondary savings account. Moreover, determining if a loan is for a personal watercraft as opposed to a primary car to get to work may provide more detailed analysis. Furthermore, because the accounts are quantified, this may provide information for the amount of and type of accounts being opened or closed. This analysis may also be conducted in view of a geographic range. Indeed, step 306 may incorporate one or more steps to determine whether at least one account was opened or closed with a time frame (306b) and determine a geographic location where the at least one account was opened or closed (306c). Such information may be useful when comparing several scores for a plurality of individuals or entities, for example, when creating an index at step 314.

Indeed, in one embodiment, an index score may be created for a user-defined geographic region. For example, if a geographic region's industry relies heavy on oil and gas production and indications from methods incorporating one or more teachings of this disclosure suggest that savings accounts are being closed and/or are being depleted from funds (such as may be determined at step 306d-which determines the amount of funds within one or more of the financial accounts), this may suggest unfavorable local economic conditions, however, may not (depending on the severity) affect a larger geographic region (i.e., nationally). In contrast, an increase in funds being deposited into savings or investment accounts in a regions heavily dominated by oil and gas may signify a forecasted improvement in other geographic regions in a set time-frame.

Step 306e may be performed to assign a factor to at least one account based upon financial characteristics of the account that differ from other accounts within the same account type. In one embodiment, step 306e may consider the interest rate on a loan or the return on an investment account. Indeed, if an entity or individual is suddenly opening high interest rate credit accounts (in which the determination of "high interest rate" may be based on their past accounts), these accounts may be applied a factor so their "weight" is considered more or less significant in further calculations.

The calculation of the account sub-score at step 306 may be a function of the quantity of funds within a plurality of the account types for a time frame. For embodiments, where a plurality of entities and/or individuals' accounts are considered, such as when compiling an index, certain types of accounts may be considered, such as only accounts belonging to entities within a certain industry or group of industries. Other factors may include the geographic and/or time frames. Moreover, several accounts closing in one geographic range may be offset with other accounts opening in another geographic range, suggesting a population migration. In one embodiment, the contact information on file for at least one of the accounts is determined to ensure that the closure of an account is not due to a relocation of the individual or entity. For example, if it appears that a savings account has been depleted or closed, the contact information of one or more remaining accounts may be consulted to confirm the entity or user has not moved.

In certain embodiments, data from step 306 may be utilized in step 304. For example, if an account is identified as an investment account in step 306f, one or more characteristics regarding the account and/or any results from step 306 relating to the investment account may be inputted into step 304c. Moreover, having data from multiple accounts may provide a more accurate prediction of economic conditions. For example, if a user opens an investment account in the form of a CD, however, cuts spending by 20%, this may indicate perceived or actual unfavorable economic conditions, despite the fact that the user has opened an investment account. However, if the user merely shifts 5% of spending into an investment account, it may not favor unfavorable economic conditions. As discussed above, these trends may be monitored over a period of time to continually update financial models and/or provide an economic outlook for a different time frame.

Figure 3B:
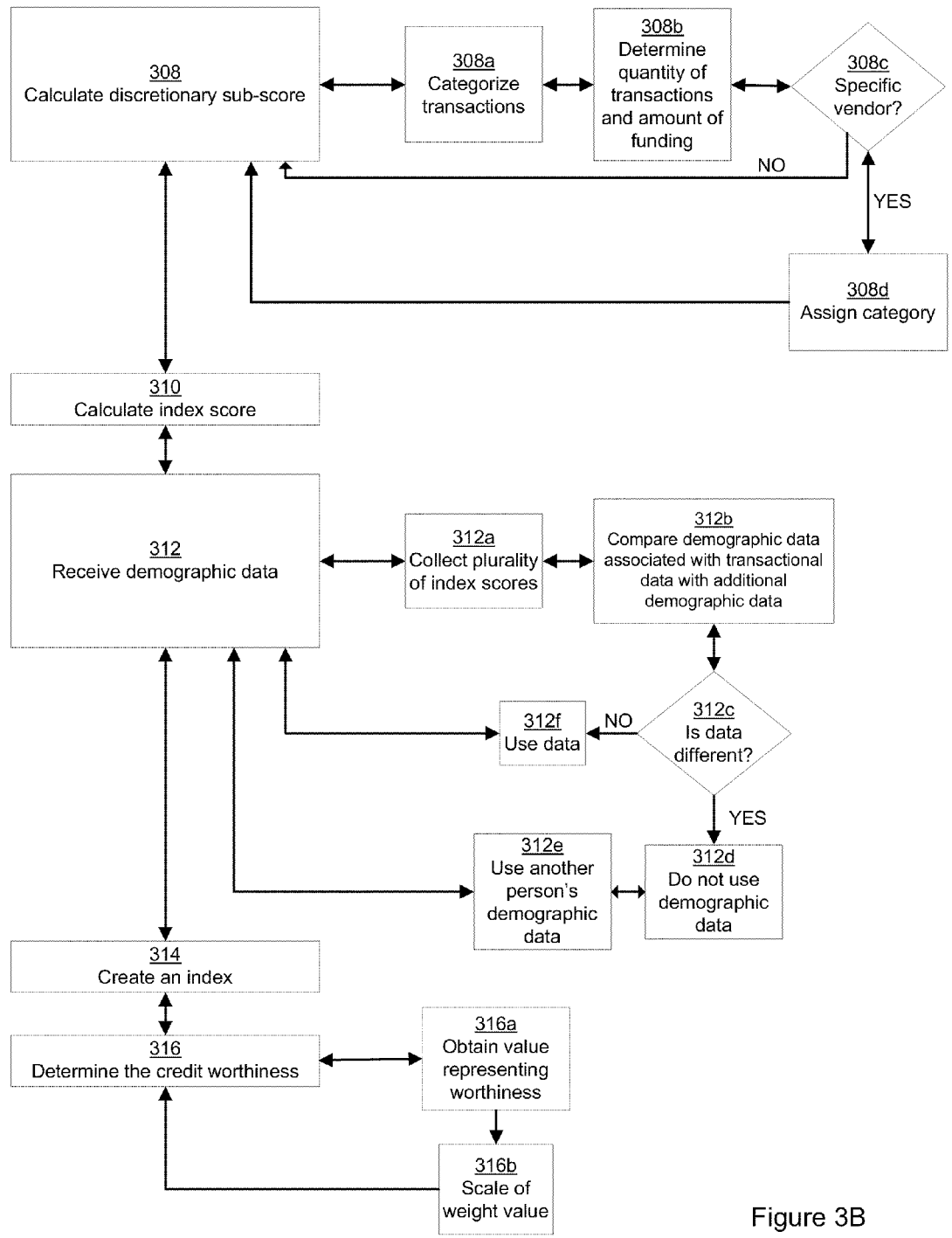

Looking to FIG. 3B, step 308 may be implemented in one embodiment to categorize transactions within the transactional data as either discretionary or necessity. In one embodiment, at least a portion of the data is categorized within an expenditure category. In one embodiment step 308a is utilized to categorize the transactions into a number of different categories. The categories may allow for segmentation of the data and provide useful data trends over time. The categories may include:

1. Airlines
2. Automobiles
3. Brokerage
4. Business Income
5. Business Contractors/Supply
6. Cash
7. Charities & Donation
8. Coffee Stores
9. Computer Hardware/Software
10. Craft stores
11. Drug Stores/Pharmacy
12. Debt Payments (not including Credit Cards with zero revolving balance)
13. Education (Schools, Colleges, Universities, Vocational)
14. Electronic Stores, retailers (online retailers)
15. Entertainment
16. Financial Services
17. Fitness
18. Gas Stations
19. Grocery Stores
20. Hair Care
21. Health care
22. Home Improvement Stores
23. Income
24. Insurance
25. Internet Service Providers
26. Lodging
27. Magazine Subscriptions
28. Mortgage Debt Payments
29. Other Income
30. Parking
31. Pet Stores
32. Phone Service
33. Prepaid Cards
34. Rental Cars
35. Restaurants
36. Discount Retailers
37. Non-Discount Retailers
38. Retirement Income
39. Satellite TV/Cable TV
40. Small Businesses
41. Smoothie Stores
42. Travel Services
43. Utilities
44. Wireless Phone Service Those skilled in the art will realize that the above list of categories is not exhaustive but rather an exemplary listing.

Step 308b may be implemented to determine i) the quantity of transactions and ii) the amount of spending for the transactions for a time frame for at least one expenditure category. Indeed, the quantity of transactions may provide some insight into the economic forces faced by the individual or entity. For example, if a user drastically increases spending at the Smoothies Stores (category 41), this may not truly indicate a discretionary item if it appears from the number of transactions that the user is replacing a regular restaurant for lunch with products from the Smoothie Stores. Furthermore, if a user has several purchases from fast food restaurants, this may not indicate that the user is cutting back spending, rather by looking into the spending over a previous time period, it may demonstrate that this is a user who historically brought their own lunch to work from home and now is starting to dine out, and thus spend more discretionary income.

Step 308c may be implemented to determine if at least one transaction was conducted with at least one specific vendor. For example, merely reviewing the quantity of transactions or even the total expenditure within category of "Home Improvement" (Category 22) may not provide an accurate portrayal of economic conditions. For example, spending $500.00 may be routine expenditures for trash bags, light bulbs, cleaning supplies, and the like; however, it may also be a single large purchase like a couch. Thus, identifying specific vendors that sell only luxury and/or high priced item may provide a more realistic approach. In one embodiment, step 308d may be implemented to assign a category based upon the vendor.

Such purchases through identified vendors may be divided by the sum of the number and/or dollar amount for transactions believed to be predominately necessity (shown in the list below). In one embodiment, one or more vendors may be selected from the group consisting of: Entertainment, Lodging, Rental Cars, Restaurants, Retailers—Up Scale, Travel Services, and Home Improvement.

In yet another embodiment, categories may be identified as Necessity. Such categories may include, but are not limited to: Debt Payments, Gas Stations, Grocery Stores, Healthcare, Insurance, Mortgage Debt Payments, and Utilities, such as electricity, gas, water. Those skilled in the art will realize that the above-referenced Discretionary and Necessity categories are merely exemplary and that numerous other categories may be considered as well as subdividing the categories above.

In yet another embodiment, categories may be identified as Discretionary. Such categories may include, but are not limited to: Airlines, Coffee Stores, Craft Stores, Entertainment, Lodging, Rental Cars, Restaurants, Retailers—Up Scale, Smoothie Stores, and/or Travel Services. The type of entity, however, may dictate whether such categories are classified as discretionary or necessity. For example, while travel expenses may be considered discretionary for one individual, to another or a business, travel expenses may be a necessary part of their business. In one embodiment, the industry (or other classification) may be assigned to one or more accounts associated with an individual or business (see step 308d). Indeed, an increase in travel expenses may signify an increase in business activity—and forecast a projected profit. Such expenditures that may be of particular importance in one or more embodiments may include, but are not limited to: Airlines, Entertainment, Lodging, Rental Cars, Restaurants, and/or Travel Services.

At step 310, an index score may be calculated. In one embodiment, at least one of the investment sub-score, the account sub-score, and/or the discretionary spending sub-score is utilized. In one embodiment, the index score is calculated by using all three sub-scores. In one such embodiment, each of the three sub-scores are summed together to create the index score. In yet another embodiment, one or more of the sub-scores are "weighted" more heavily than another sub-score. In yet another embodiment, one or more additional sub-scores or considerations or inputted into the calculation of the index score. In one embodiment, the timeframe utilized when calculating each sub-score is the same, yet in other embodiments, at least one sub-score was calculated with a different time-frame than another sub-score. In one embodiment, the geographic range utilized in determining one sub-score, such as the opening or closing of accounts may be the same as the geographic range utilized in the calculation of another sub-score.

At step 312, demographic data associated with the transactional data may be received. In one embodiment, step 312 may first collect a plurality of index scores each representing an individual or entity within a geographic range (i.e., step 312a) such as using information available from step 310. Step 312b may be implemented to compare the demographic data associated with the transactional data collected at step 312a with other demographic data (i.e., data not associated with the transactional data) to determine the population dynamics for the transactional data. Step 312c may be implemented to determine if the data associated with the transactional data is statistically different than that of the other demographic data. In one embodiment, if the demographic data not associated with the transactional data is different, then in embodiment, it is not used in the determination of the population dynamics (step 312d). For example, the demographic data represent an MSA (Metro Statistical Area). In one embodiment, the demographic data associated with the transactional data regarding entities in the MSA of Charlotte, N.C. may not accurately represent the MSA data for the entire population of Charlotte, N.C. Therefore, in at least one embodiment, that MSA data is not combined or otherwise used in step 312.

In another embodiment, however, step 312e may be conducted following 312d, in which demographic data representing another geographic area may be utilized. For example, in one embodiment, Charlotte, N.C. may have the similar demographic characteristics as another MSA, thus demographic data from a second MSA may be used in conjunction with, or as an alternative to, the demographic data from which the data was collected (Charlotte, N.C.). In another embodiment, the actual data collected from the transactions may strongly differ from the demographic data (i.e. MSA data) relating to the geographic region (Charlotte, N.C.) in which it originated from. For example, the collection of transactions (or a portion thereof) received in step 302 may originate from a younger demographic group than is the average of the MSA. In one embodiment, it may be determined that such individuals are college students. In one embodiment, the demographic MSA data from Charlotte may not be used, but rather demographic data from college towns, such as Raleigh/Durham, N.C. or Gainesville, Fla. may be utilized. (See Step 312e).

Step 314 may be implemented to receive a plurality of index scores representing an individual or entity and use the index scores to create an index for a geographic region. In one embodiment, the geographic region corresponds to an MSA. In other embodiments, the geographic range may be a city, a county, a state, or an entire country. Indeed, any geographic range may serve as the geographic region for the purposes of this disclosure. The creation of an index may be performed by a myriad of computational methods known in the art. Indeed, in one embodiment, the mean, mode, or medium of the individual index scores may be used in the creation of the index.

Step 316 may optionally be implemented to determine the credit worthiness of the individual or entity for which at least one index score represents (see 316a). In one embodiment, a FICO® score for the individual may be received. The FICO® score may be used along with a cash flow and net worth statement and/or any information collected in steps 302-312. Indeed, some individual's spending may not accurately reflect the economic forces they are facing. In one embodiment, the index score may be weighted or scaled (step 316b) based upon the FICO® score or another indication of credit worthiness.

Further aspects of the invention relate to using one or more sub-scores from one or more industries to create an index. The calculation of the sub-scores may be conducted through one or more methods described above or its equivalent. In one embodiment, data collected as part of earlier analysis may be utilized. For example, one or more steps 302-316 may be conducted for a single entity and later that entity's sub-score (s) or portions thereof may be used in further analysis. In yet other embodiments, a step similar to step 302 may be conducted in which transactional data is received. Further steps may be implemented to categorize each transaction to an industry category (such as representing an economic sector). For example, one account's transaction may be an expenditure at a home improvements store. Equally, another transaction may be the home improvement store receiving the funds from the consumer's expenditure. Thus, not only is the received information in this embodiment useful to determine spending habits (i.e., discretionary or necessity) but also may provide an insight into the overall health of certain economic sectors.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-implemented method of calculating an index score representing an individual or entity, the method comprising:
   calculating, with a processor, an investment sub-score, the method comprising:
   determining whether transactional data comprises an investment, wherein if the transactional data does not comprise an investment, assigning a predefined value as the investment sub-score, and wherein if the transactional data comprises an investment, performing the method of analyzing the transactional data comprising:
   determining a source of funding for the investment;
   determining the duration of the investment; and
   determining an amount of the funding for the investment as a ratio to a user's or entity's overall spending for a time-frame;
   calculating, with the processor, an account sub-score, the method comprising:
   categorizing a quantity of financial accounts associated with the individual into an account type;
   determining an amount of funds within the financial accounts; and
   calculating, with the processor, the account sub-score as a function of the quantity of funds within a plurality of the account types for a time frame;
   calculating, with the processor, a discretionary spending sub-score, the method comprising:
   categorizing transactions within the transactional data as either discretionary or necessity, wherein the categorizing of the data includes the method comprising:
   for at least one expenditure category, determining i) the quantity of transactions and ii) the amount of spending for the transactions for a time frame; and
   determining if at least one transaction was conducted with at least one specific vendor; and calculating an index score.

2. The method of claim 1, further comprising:
   receiving demographic data associated with the transactional data;
   receiving a plurality of index scores representing an individual or entity within a geographic range;
   comparing the demographic data associated with the transactional data with demographic data not associated with the transactional data to determine the population dynamics for the transactional data, wherein if the data associated with the transactional data is statistically different than that of the demographic data not associated with the transactional data, the demographic data not associated with the transactional data is not used in the determination of the population dynamics.

3. The method of claim 2, wherein the individual or entity is an entity, and the method further comprising:
   assigning the entity to a industry category.

4. The method of claim 1, wherein the method of calculating the account sub-score comprises:
   assigning a factor to at least one account based upon financial characteristics of the account that differ from other accounts within the same account type.

5. The method of claim 1, wherein the method of calculating the account sub-score comprises:
   determining that at least one account was opened or closed with a time frame; and determining a geographic location where the at least one account was opened or closed.

6. The method of claim 1, further comprising: collecting a plurality of index scores representing an individual or entity; and
   creating an index for a geographic region.

7. The method of claim 1, further comprising:
   determining credit worthiness of the individual or entity; and
   scaling the index score based upon the credit worthiness of the individual or entity.

8. The method of claim 1, wherein the transactional data is selected from the group consisting of:
   credit and debit card transactions, electronic bill payment transactions, checking and saving account transactions, and combinations thereof.

9. The method of claim 1, wherein the time frame for each sub-score is substantially the same.

10. The method of claim 1, wherein at least one sub-score is weighted differently than at least one other sub-score in the calculation of the index score.

11. The method of claim 1, wherein the transactions identified through the vendor are divided by the sum of the number or dollar amount for transactions believed to be predominately necessity.

12. A system configured to construct an index for an economic sector comprising:
   one or more computer-readable mediums configured to receive transactional data relating to a plurality of transactions for a plurality of accounts, wherein at least a portion of the plurality of accounts relate to a first entity and a portion relates to a second entity;
   one or more processors configured to categorize the transactional data stored on the one or more computer-readable mediums into at least one industry or sector;
   one or more processors configured to calculate at least one sub-score for at least one industry or sector, wherein the sub-scores are selected from the group consisting of:
   an investment sub-score, an account sub-score, and a discretionary sub-score, wherein calculating the investment sub-score comprises:
   determining whether the transactional data comprises an investment, wherein if the transactional data does not comprise an investment, a predefined value is assigned as the investment sub-score, and wherein if the transactional data comprises an investment, performing the method comprising:
   determining a source of funding for the investment;
   determining the duration of the investment; and
   determining an amount of the funding for the investment as a ratio to a user's or entity's overall spending for a time-frame;
   wherein the method for calculating an account sub-score comprises:
   categorizing a quantity of financial accounts associated with the individual into an account type;
   determining an amount of funds within the financial accounts; and
   calculating the account sub-score as a function of the quantity of funds within a plurality of the account types for a time frame; and
   wherein calculating a discretionary spending sub-score comprises:
   categorizing transactions within the transactional data as either discretionary or necessity, wherein the categorizing of the data includes the method comprising:
   for at least one expenditure category, determining i) the quantity of transactions and ii) the amount of spending for the transactions for a time frame; and
   determining if at least one transaction was conducted with at least one specific vendor.

13. The system of claim 12, wherein at least one or more computer-readable mediums comprise computer-executable instructions, that when executed by a processor, is configured to perform the method comprising: calculating an index score.

14. The system of claim 13, wherein the computer-executable instructions for calculating the index score, when executed by a processor, further comprise: weighting a first sub-score differently than at least one other sub-score in the calculation of the index score.

15. The system of claim 12, wherein the computer-executable instructions for calculating the account sub-score, when executed by a processor perform the method comprising: assigning a factor to at least one account based upon financial characteristics of the account that differ from other accounts within the same account type.

16. The system of claim 12, wherein the computer-executable instructions for calculating the account sub-score, when executed by a processor, perform the method comprising: determining that at least one account was opened or closed with a time frame; and determining a geographic location where the at least one account was opened or closed.

17. The system of claim 12, wherein the time frame for each sub-score is substantially the same.

18. A non-transitory computer-readable medium comprising computer-executable instructions that when executed cause one or more processors to perform the method comprising:
   categorizing transactional data from a plurality of transactions into at least one industry or sector;
   for at least one sector, calculating at least one sub-score selected from the group consisting of:
   investment sub-score, account sub-score, and discretionary sub-score; wherein calculating the investment sub-score comprises:
   determining whether the transactional data comprises an investment, wherein if the transactional data does not comprise an investment, a predefined value is assigned as the investment sub-score, and wherein if the transactional data comprises an investment, performing the method comprising:
   determining a source of funding for the investment; determining the duration of the investment; and
   determining an amount of the funding for the investment as a ratio to a user's or entity's overall spending for a time-frame; wherein the method for calculating an account sub-score comprises:
   categorizing a quantity of financial accounts associated with the individual into an account type;
   determining an amount of funds within the financial accounts; and
   calculating the account sub-score as a function of the quantity of funds within a plurality of the account types for a time frame; and wherein calculating a discretionary spending sub-score comprises:
   categorizing transactions within the transactional data as either discretionary or necessity, wherein the categorizing of the data includes the method comprising:
   for at least one expenditure category, determining i) the quantity of transactions and ii) the amount of spending for the transactions for a time frame; and
   determining if at least one transaction was conducted with at least one specific vendor.

19. The non-transitory computer-readable medium of claim 18 storing the computer-executable instructions, which when executed by a processor, cause the processor to further perform the method comprising: calculating an index score.

20. The non-transitory computer-readable medium of claim 19, wherein the method of calculating the account sub-score comprises:
   determining that at least one account was opened or closed with a time frame; and
   determining a geographic location where the at least one account was opened or closed.

* * * * *